United States Patent
Hicks, III

(10) Patent No.: US 8,654,631 B2
(45) Date of Patent: Feb. 18, 2014

(54) METHOD AND APPARATUS FOR PROVIDING AN INTELLIGENT BACK-UP INTERNET PROTOCOL (IP) CONNECTION

(75) Inventor: John Alson Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 503 days.

(21) Appl. No.: 12/579,924

(22) Filed: Oct. 15, 2009

(65) Prior Publication Data

US 2011/0090788 A1 Apr. 21, 2011

(51) Int. Cl.
*H04L 5/12* (2006.01)

(52) U.S. Cl.
USPC ............ 370/225; 370/228; 709/224; 714/4.3; 714/4.11

(58) Field of Classification Search
USPC ......... 370/217, 228, 237, 400, 219, 220, 225; 709/224, 239; 714/46, 4.3, 4.11
See application file for complete search history.

(56) References Cited

U.S. PATENT DOCUMENTS

| | | | |
|---|---|---|---|
| 7,508,754 B1* | 3/2009 | Sankaranaraynan et al. | 370/225 |
| 7,983,148 B1* | 7/2011 | Abramson et al. | 370/217 |
| 2002/0196802 A1* | 12/2002 | Sakov et al. | 370/432 |
| 2003/0182556 A1* | 9/2003 | Sunder et al. | 713/176 |
| 2004/0031030 A1* | 2/2004 | Kidder et al. | 717/172 |
| 2007/0245167 A1* | 10/2007 | De La Cruz et al. | 714/4 |
| 2008/0069135 A1* | 3/2008 | Forrest et al. | 370/465 |
| 2010/0162034 A1* | 6/2010 | Degenhardt et al. | 714/4 |
| 2010/0208741 A1* | 8/2010 | Vasseur | 370/400 |
| 2011/0072312 A1* | 3/2011 | Fan et al. | 714/46 |

* cited by examiner

*Primary Examiner* — Awet Haile

(57) ABSTRACT

A method, computer readable medium and apparatus for providing a back-up internet protocol (IP) connection are disclosed. For example, the method monitors a primary IP connection to a subscriber premises, detects a failure or a degradation of the primary IP connection to the subscriber premises and activates a back-up IP connection to the subscriber premises.

20 Claims, 4 Drawing Sheets

METHOD AND APPARATUS FOR PROVIDING AN INTELLIGENT BACK-UP INTERNET PROTOCOL (IP) CONNECTION

The present invention relates generally to providing an internet protocol (IP) connection to a subscriber premises and, more particularly, to a method and apparatus for providing an intelligent back-up IP connection to a primary IP connection.

BACKGROUND OF THE INVENTION

Many homes have various endpoint devices connected to the Internet or a network via an internet protocol (IP) data connection. Some IP data connections are unreliable and suffer from intermittent loss of connection. As a result, many users may experience a temporary loss of the IP data connection. This may affect services that the users have subscribed to. In addition, the unreliability of the IP data connection may prevent expanding the use of the IP data connection to other endpoint devices such as home appliances, home security, and the like that are most effective with a reliable IP data connection that is available 24 hours a day and 7 days a week.

SUMMARY OF THE INVENTION

In one embodiment, the present invention discloses a method, a computer readable medium and an apparatus for providing a back-up internet protocol (IP) connection. For example, the method monitors a primary IP connection to a subscriber premises, detects a failure or a degradation of said primary IP connection to said subscriber premises and activates a back-up IP connection to said subscriber premises.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method, a computer readable medium and an apparatus for providing an intelligent back-up Internet protocol (IP) connection. Although the present invention is discussed below in the context of IP Multimedia Subsystem (IMS) networks, the present invention is not so limited. Namely, the present invention can be applied to packet networks in general, e.g., Voice over Internet Protocol (VoIP) networks, Service over Internet Protocol (SoIP) networks, wireless networks, and the like.

Figure 1:
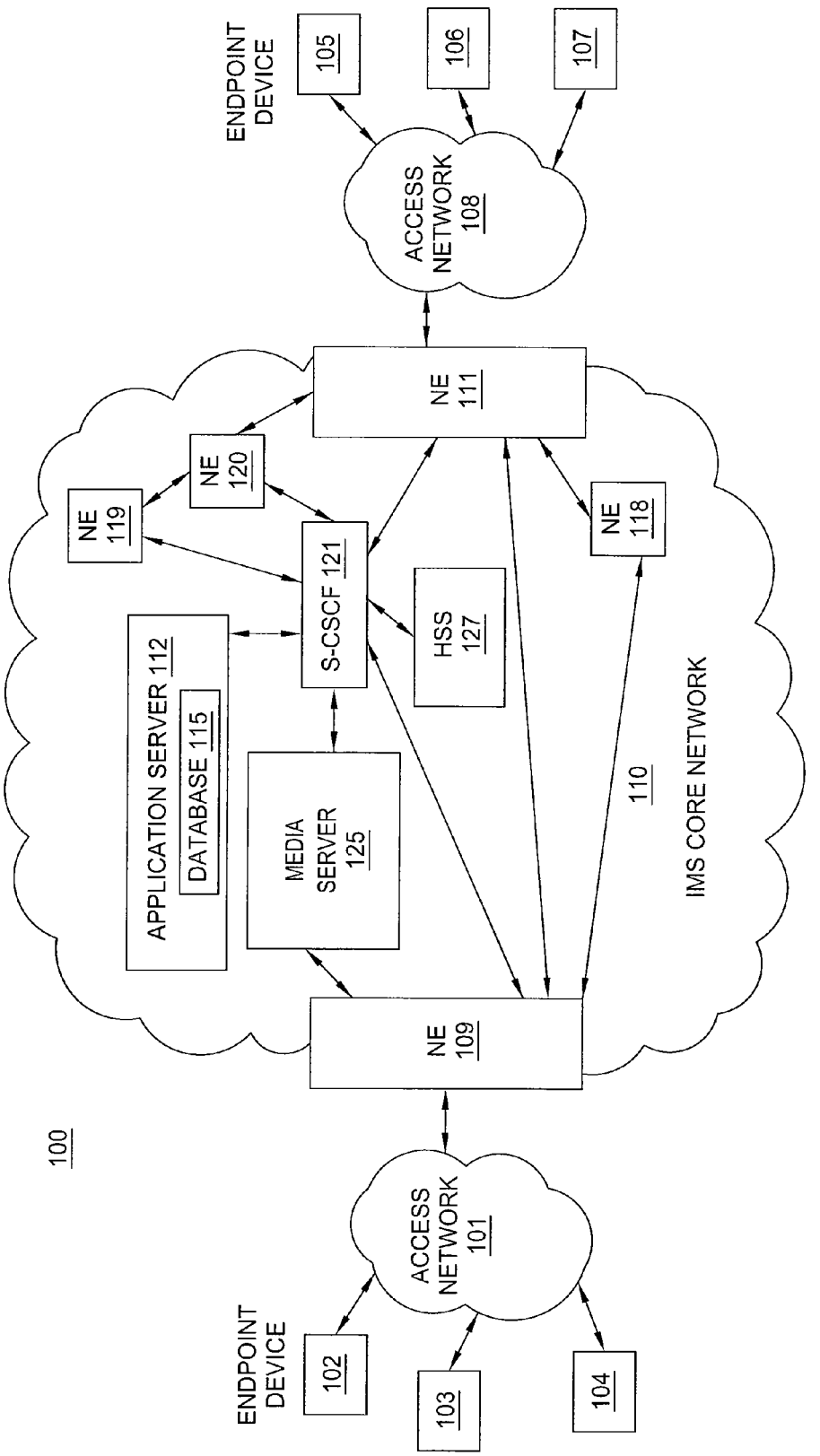
FIG. 1 illustrates an exemplary network related to the present invention.

To better understand the present invention, FIG. 1 illustrates an example network 100, e.g., an IMS network related to the present invention. An IP network is broadly defined as a network that uses Internet Protocol to exchange data packets. Exemplary IMS networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. In addition, a plurality of endpoint devices 105-107 are configured for communication with the IMS core packet network 110 via an access network 108. The network elements 109 and 111 may serve as gateway servers or edge routers for the network 110.

The endpoint devices 102-104 may represent servers that are data sources or other endpoint users. The endpoint devices 105-107 may represent endpoint devices within a subscriber's premises or home. The endpoint devices 102-107 may comprise customer endpoint devices such as wireless telephones, smart phones, wired telephones, personal desktop computers, laptop computers, Personal Digital Assistants (PDAs), video cameras, home appliances, and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice, data and multimedia services are transmitted on networks. The current invention discloses a method and apparatus for providing an intelligent back-up IP connection in an exemplary communication network illustrated in FIG. 1 and as described above.

Figure 2:
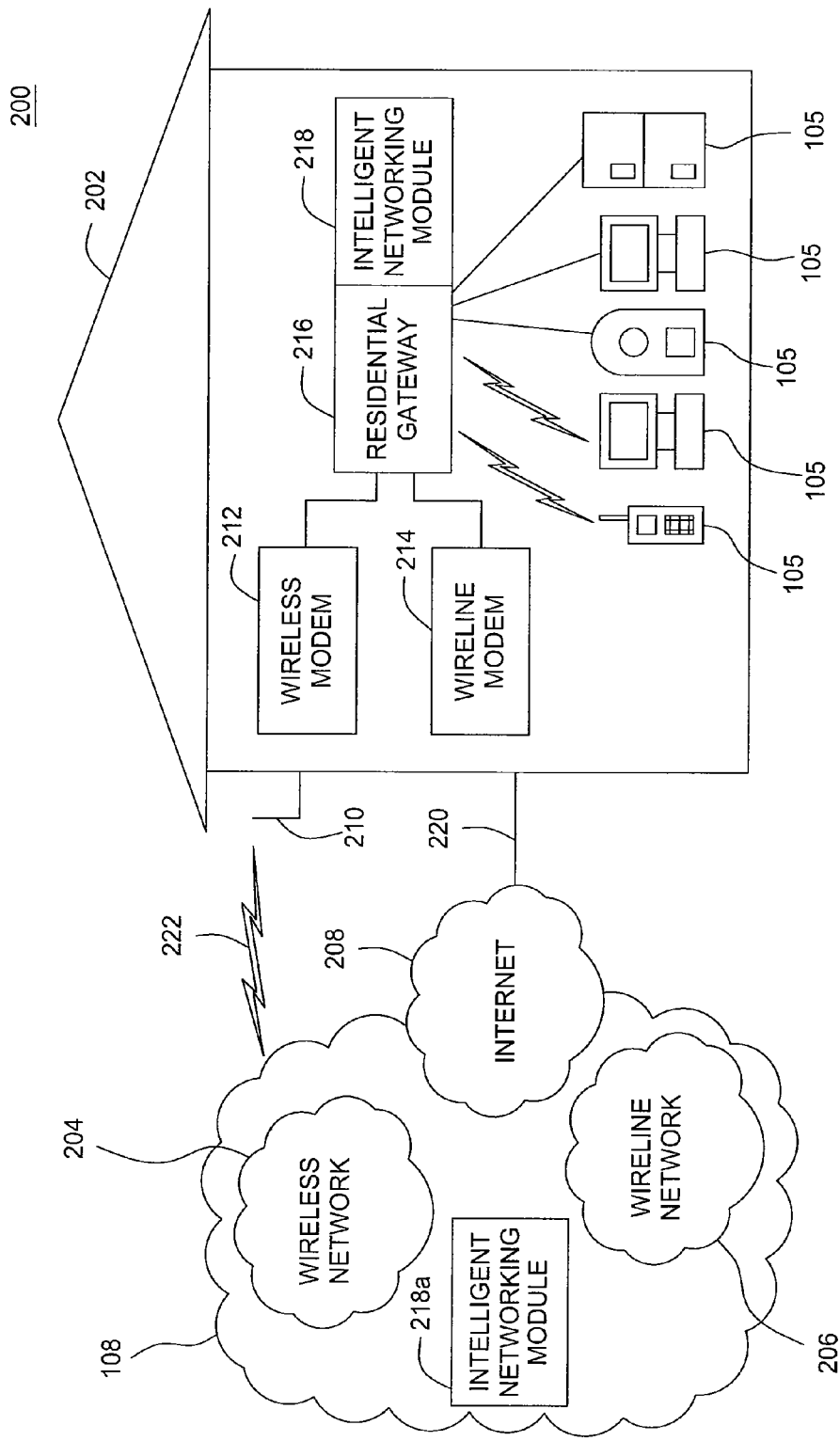
FIG. 2 illustrates a high level block diagram of the present invention.

FIG. 2 illustrates a high level block diagram of a network architecture 200 for providing an intelligent back-up IP connection. FIG. 2 provides more detail of FIG. 1 from the access network 108 out to a plurality of the endpoint devices 105.

In one embodiment, the network architecture 200 includes the access network 108. The access network 108 may include a wireless network 204, a wireline network 206 and the Internet 208.

The network architecture 200 may also include a subscriber premises or home 202. Although a single subscriber premises 202 is shown for clarity, it should be noted that many subscriber premises 202 may be connected to the access network 108. In one embodiment the subscriber premises 202 may comprise a wireless modem 212, a wireline modem 214, a residential gateway 216 and a plurality of endpoint devices 105. The wireless modem 212 may include an antenna 210 that may be part of the wireless modem 212 or may be remotely coupled to the wireless modem 212, e.g., attached to an external portion of the subscriber premises 202 and connected to the wireless modem 212 via a cable or wire. The plurality of endpoint devices 105 may include wired and/or wireless endpoint devices. As noted above, the plurality of endpoint devices 105 may include wireless telephones, wired telephones, personal desktop computers, laptop computers, Personal Digital Assistants (PDAs), video cameras, home appliances, and the like.

In one embodiment, the residential gateway 216 may include an intelligent networking module 218. In addition, the residential gateway 216 is in communication with the wireless modem 212 and the wireline modem 214. It should be noted, however, that the wireless modem 212, the wireline modem 214, the residential gateway 216 and the intelligent networking module 218 can all be configured as a single piece of hardware or one or more different hardware components.

In one embodiment, the wireline network 206 is connected to the subscriber premises 202 via a link 220. In one embodiment, the wireline network 206 may be a wireline IP data network. For example, the wireline IP data network may comprise an asymmetric digital subscriber line (ADSL) network, a very-high-data-rate digital subscriber line (VDSL) network, an optical network terminal (ONT) network, a cable network and the like. It should be noted that all of the wireline networks are only those wireline networks that transfer IP data packets.

The wireless network 204 is connected to the subscriber premises via a wireless link 222. In one embodiment, the wireless network 204 may be a wireless IP data network. For example, the wireless IP data network may comprise an Enhanced Data for GSM Evolution (EDGE) network, a universal mobile telecommunications system (UMTS) network, a high speed downlink packet access (HSDPA) network, a long term evolution (LTE) network, and the like. It should be noted that all of the wireless networks are only those wireless networks that transfer IP data packets.

In one embodiment, the service provider of residential gateway 216 may not be the same service provider of the wireless network 204 or the wireline network 206. For example, the wireless network 204 may be operated by a first service provider, the wireline network 206 may be operated by a second different service provider and the residential gateway 216 and associated services may be provided by a third different service provider.

Referring back to the intelligent networking module 218, the intelligent networking module 218 performs functions to provide an intelligent back-up IP data connection to the subscriber premises 202. One of many reasons that the intelligent networking module 218 is "intelligent" is due to its ability to automatically detect when a primary IP connection fails or is severely degraded in performance and its ability to automatically activate or switch over to a back-up IP connection, as discussed below.

In one embodiment, the intelligent networking module 218 monitors a primary IP connection to the subscriber premises 202. For example, the wireline network 206 may serve as the primary IP connection. The intelligent networking module 218 may monitor the primary IP connection to detect if a failure or a degradation has occurred. In another embodiment, a second intelligent networking module 218a may be included in the access network 108 to allow the monitoring to be assisted by the access network 108 as well as being performed at the subscriber premises 202.

In one embodiment, a failure may be detected by using a heartbeat signal or periodically "pinging" the wireline network 206 with a ping signal. When the intelligent networking module 218 fails to hear the heartbeat signal or receive a response "ping" from the wireline network 206, the intelligent networking module 218 may detect that a failure has occurred. Although only a few examples of monitoring are discussed, it should be noted that any monitoring technique may be used.

In one embodiment, the intelligent networking module 218 may receive over the back-up IP connection information as to why the primary IP connection has failed. For example, if the wireline network 206 fails, the intelligent networking module 218 may receive information and updates regarding the wireline network 206 over the wireless network 204. The information may include the reason the wireline network 206 failed, e.g., a power failure, a server failure, a detection of a miss-configuration, and the like. The update information may include, for example, an estimate of when the wireline network 206 will be restored. This provides more information to the subscriber to allow the subscriber to potentially troubleshoot the problem at the subscriber premises 202 or simply inform the subscriber. This leads to greater subscriber satisfaction with the service provider.

In another embodiment, the intelligent networking module 218 may receive information as to why the primary IP connection is experiencing a degraded performance or failure from the second intelligent networking module 218a if the second intelligent networking module 218a is deployed. For example, the intelligent networking module 218a may use the primary IP connection if the primary IP connection is available, or the back-up IP connection if necessary.

In one embodiment, a degradation may be detected by periodically sampling performance data of the primary IP connection. For example, the intelligent networking module 218 may collect performance data such as transmission times, available bandwidth, bit error rates, and the like. Moreover, a predefined threshold may be programmed into the intelligent networking module 218 for one or more of the performance data. For example, each one of the collected performance data may have a separate predefined threshold or a single overall predefined threshold may be used taking into account a single performance data parameter or all of the collected performance data. If any one or more of the performance data collected exceeds the respective predefined threshold, the intelligent networking module 218 may detect a degradation or deem that a degraded condition is detected. For example, if a transmission time exceeds one minute, then the intelligent networking module 218 may detect a degradation.

If the intelligent networking module 218 detects a failure or a degradation, then the intelligent networking module 218 automatically activates a back-up IP connection to the subscriber premises 202. In other words, the intelligent networking module 218 may switchover the subscriber premises 202 to a back-up IP connection. In one embodiment, the back-up IP connection is provided by the wireless network 204. As a result, the subscriber premises 202 may have a continuous IP connection even if the primary IP connection fails or is disconnected.

In one embodiment, the subscriber may be provided an option as to whether or not they would like to activate the back-up IP connection. For example, after the intelligent networking module 218 detects a failure or degradation of the primary IP connection a notification may be provided to the subscriber. The notification may be displayed on whatever endpoint device 105 the subscriber is currently using. The notification may provide an option to the subscriber as to whether they would like to activate the back-up IP connection.

The service provider may utilize the optional configuration to activate the back-up IP connection as a pay-per-use or pay-as-needed service feature. For example, some subscribers may not want to pay additional premiums for having an intelligent back-up IP connection continuously available, but rather only pay for the service when it is actually used.

In addition, the residential gateway 216 and the intelligent networking module 218 have tracking and reporting capabilities. As a result, the residential gateway 216 and the intelligent networking module 218 may communicate back with either the wireless network 204 service provider or the wireline network 206 service provider and be informed of scheduled maintenance. As a result, the intelligent networking module 218 may also switch over to the back-up IP connection in advance of the primary IP connection being taken down for scheduled maintenance without it affecting the subscriber's services.

In addition, the residential gateway 216 and the intelligent networking module 218 may track and report how often switching between the primary IP connection and the back-up IP connection occurs. This may help the service provider of the primary IP connection to determine if maintenance is required. For example, if the primary IP connection has a high failure rate or a high instance of degradations, then the service provider of the primary IP connection may troubleshoot the primary IP connection or send technicians out to investigate.

After the back-up IP connection is activated, the intelligent networking module 218 may continuously monitor the primary IP connection to the subscriber premises 202 to determine if the primary IP connection is functioning properly. In one embodiment, "properly" may be defined as the ability to provide all voice, data and multi-media services to the subscriber above a predetermined quality of service. In other words, "properly" may be defined as the primary IP connection is available (i.e. the failure is remedied) and there are no detected degradations in service.

Once the intelligent networking module 218 detects that the primary IP connection is functioning properly again, the intelligent networking module 218 will activate or re-activate the primary IP connection. Accordingly, the intelligent networking module 218 will deactivate the back-up IP connection once the primary IP connection is again used to provide the services to the subscriber.

As a result, a continuous IP connection is provided to the subscriber premises 202. This allows the intelligent networking module 218 to operate various applications, e.g., VoIP, home security, home video monitoring, home automation and control of various home appliances, and the like. Previously some of these applications may not have been as reliable due to intermittent loss of IP connectivity. However, the present invention provides an intelligent back-up IP connection to address the reliability issue for these types of applications.

Figure 3:
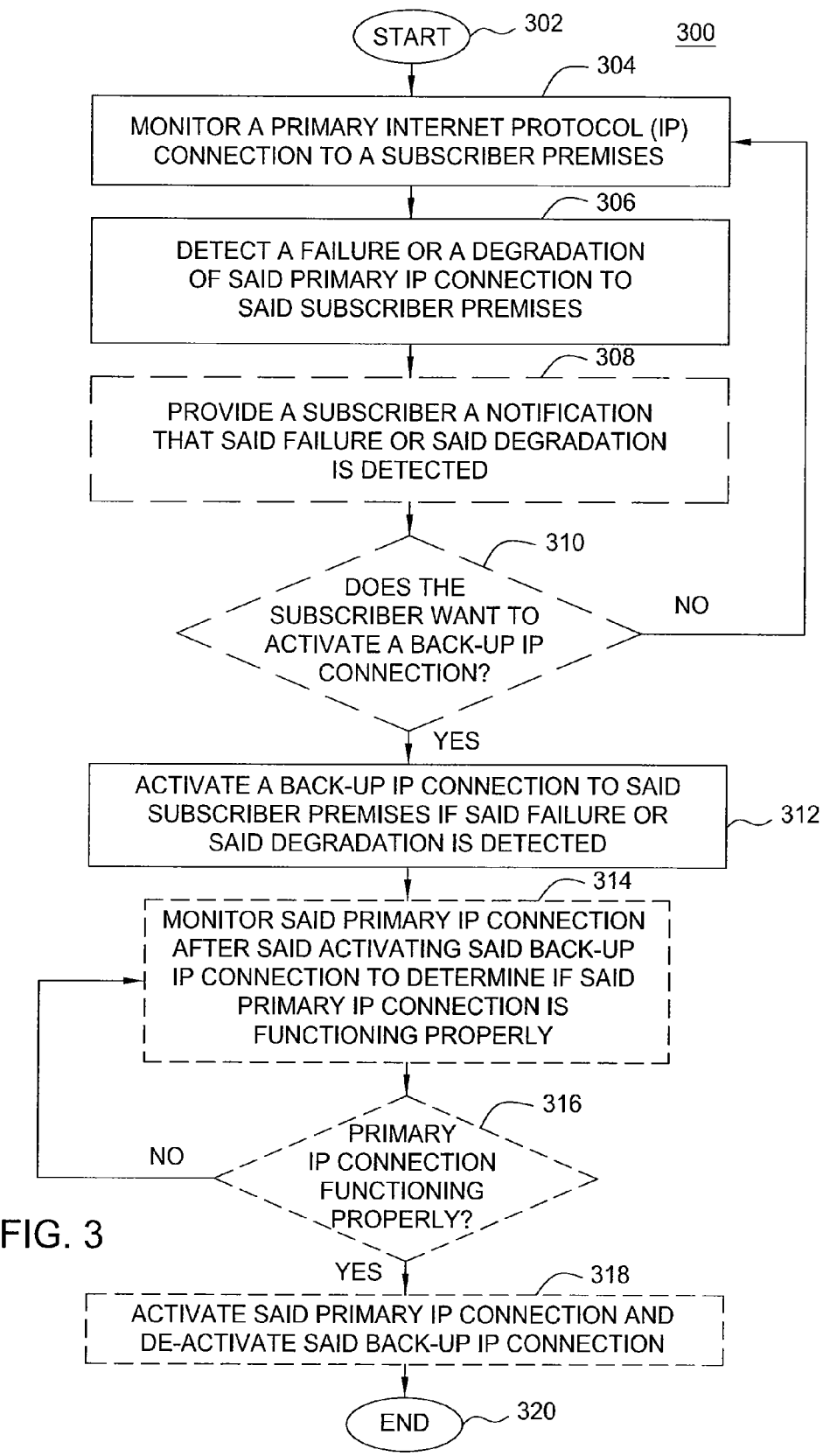
FIG. 3 illustrates a flowchart of a method for providing an intelligent back-up internet protocol (IP) connection.

FIG. 3 illustrates a flowchart of a method 300 for providing an intelligent back-up internet protocol (IP) connection. In one embodiment, one or more steps of the method 300 may be implemented by the intelligent networking module 218 or a general purpose computer having a processor, a memory and input/output devices as illustrated below in FIG. 4.

The method 300 begins at step 302. At step 304, the method 300 monitors a primary IP connection to a subscriber premises. As discussed above, in one example, the monitoring may be performed by a heartbeat monitor or "pinging". In addition, the primary IP connection may be a wireline network.

At step 306, the method 300 detects a failure or a degradation of the primary IP connection to the subscriber premises. As discussed above, the failure may be detected if the heartbeat is no longer detected or if no response is received from the "pinging". Alternatively, a degradation may be detected if performance data that is periodically collected falls below a predefined threshold.

The method 300 may then proceed to either optional steps 308 and 310 or directly to step 312. At optional step 308, the method 300 provides a subscriber a notification that the failure or the degradation is detected. Then at optional step 310, the method 300 determines if the subscriber wants to activate a back-up IP connection.

As discussed above, by providing the back-up IP connection as an option to the subscriber, the service provider may generate additional revenue by charging the subscriber on a pay-per-use basis. That is, the back-up IP data connection may be an a la carte service that may be added to the subscriber's base subscription.

Moreover, by providing the back-up IP connection as an option to the subscriber, the subscriber is given more control. For example, the subscriber may not want to switch over to the back-up IP connection if the switch over is due to a degradation. For example, the degraded performance is still acceptable to the subscriber who does not want to pay extra for the back-up IP connection service. In another example, a subscriber may be downloading a file and switching over to the back-up IP connection may require the subscriber to restart the download process. As a result, the subscriber may not want the switch over to occur at that particular time.

In one embodiment, if the subscriber does desire to switch over to the back-up IP connection during a file transfer, an intelligent file transfer may be used. For example, a data file may be split up into chunks. As a result, if a file transfer session is interrupted over the primary IP connection due to failure or a detected degradation, when the file transfer session resumes over the back-up IP connection, the file transfer session only sends the chunks that have not been received.

In addition, the subscriber may be provided another option to switch over at a later time or "snooze" the notification. After the download is complete, the subscriber may choose to switch over to the back-up IP connection.

At optional step 310, if the subscriber does not want to activate the back-up IP connection, the method 300 loops back to step 304 and continues to monitor the primary IP connection. If the subscriber does want to activate the back-up IP connection, the method 300 proceeds to step 312.

The method 300 proceeds to step 312 from either optional step 310 or directly from step 306. At step 312, the method 300 activates the back-up IP connection to the subscriber premises if the failure or the degradation is detected. As discussed above, the back-up IP connection is provided via the wireless network 204.

At optional step 314, the method 300 may continuously monitor the primary IP connection after activating the back-up IP connection. This is to determine when the primary IP connection is functioning properly again.

At optional step 316, if the primary IP connection is functioning properly again, the method 300 proceeds to optional step 318 to re-activate the primary IP connection and de-activate the back-up IP connection. In one embodiment, the method 300 may also notify the subscriber that the primary IP connection is functioning properly again and notify the subscriber that the primary IP connection is being re-activated and that the back-up IP connection is being de-activated.

Similar to optional step 310, the subscriber may be again provided an option to switch back to the primary IP connection or switch back to the primary IP connection at a later time. For example, the subscriber may "snooze" the notification such that they are reminded or provided the option again 5 minutes later, 1 hour later or any other time period.

If the primary IP connection is not functioning properly, the method 300 goes back to optional step 314. The method ends at step 314.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 4:
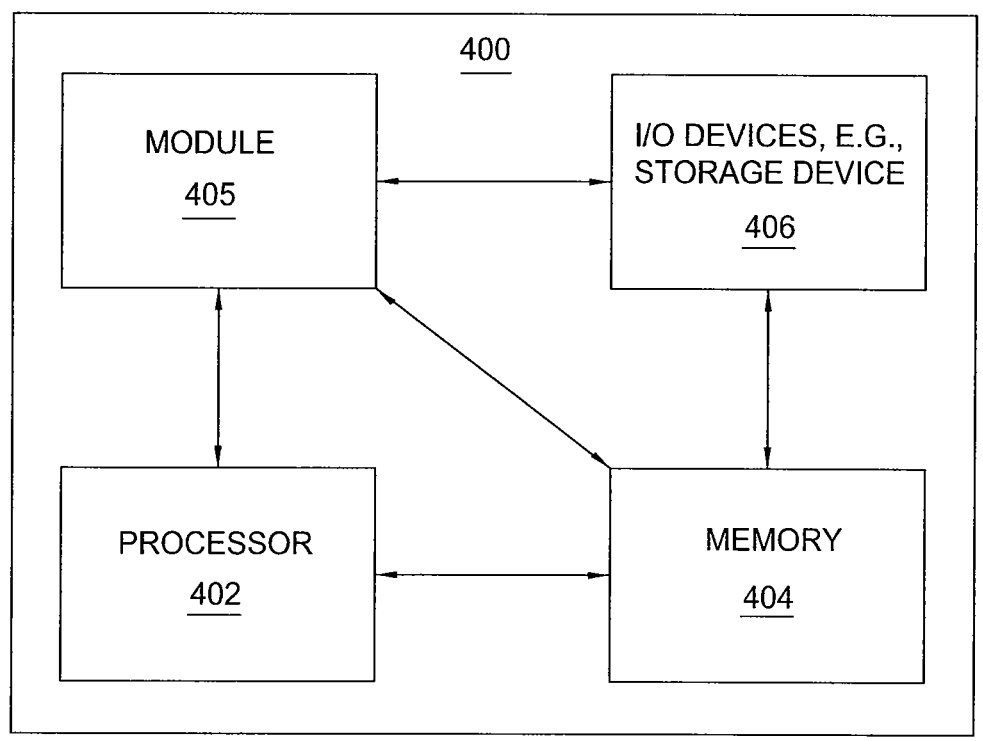
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 providing an intelligent back-up IP connection, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 providing a continuous internet protocol (IP) connection can be loaded into memory 404 and executed by processor 402 to implement the functions as discussed above. As such, the present method 405 for creating a social network map using non-voice communications (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a back-up internet protocol connection, comprising:
    monitoring, by a processor, a primary internet protocol connection to a subscriber premises, wherein the primary internet protocol connection services a plurality of endpoints at the subscriber premises;
    detecting, by the processor, a degradation of the primary internet protocol connection to the subscriber premises;
    providing, by the processor, an option to snooze a notification that the primary internet protocol connection has degraded and to switch over to the back-up internet protocol connection at a later time;
    activating, by the processor, the back-up internet protocol connection to the subscriber premises to provide a service to the plurality of endpoints at the subscriber premises at the later time;
    reporting, by the processor, a frequency of switching between the primary internet protocol connection and the back-up internet protocol connection to a provider of the primary internet protocol connection;
    obtaining, by the processor, a maintenance schedule from the provider of the primary internet protocol connection; and
    activating, by the processor, the back-up internet protocol connection to the subscriber premises in advance of the primary internet protocol connection being taken down for maintenance in accordance with the maintenance schedule.

2. The method of claim 1, wherein the monitoring is performed via a heartbeat signal.

3. The method of claim 1, wherein the detecting the degradation comprises:
    periodically sampling performance data of the primary internet protocol connection; and
    detecting the degradation if the performance data falls below a predefined threshold.

4. The method of claim 1, wherein the primary internet protocol connection comprises a wireline internet protocol data connection and the back-up internet protocol connection comprises a wireless internet protocol data connection.

5. The method of claim 1, further comprising:
    monitoring the primary internet protocol connection after the activating the back-up internet protocol connection to determine if the primary internet protocol connection is functioning properly;
    activating the primary internet protocol connection when the primary internet protocol connection is functioning properly; and
    deactivating the back-up internet protocol connection.

6. The method of claim 1, wherein the activating is performed automatically.

7. The method of claim 1, further comprising:
 before the activating, providing a subscriber with a notification that the degradation is detected; and
 providing the subscriber an option to activate the back-up internet protocol connection on a pay-per-use basis.

8. A non-transitory computer-readable medium storing a plurality of instructions, which, when executed by a processor, cause the processor to perform operations for providing a back-up internet protocol connection, the operations comprising:
 monitoring a primary internet protocol connection to a subscriber premises, wherein the primary internet protocol connection services a plurality of endpoints at the subscriber premises;
 detecting a degradation of the primary internet protocol connection to the subscriber premises;
 providing an option to snooze a notification that the primary internet protocol connection has degraded and to switch over to the back-up internet protocol connection at a later time;
 activating the back-up internet protocol connection to the subscriber premises to provide a service to the plurality of endpoints at the subscriber premises at the later time; and
 reporting a frequency of switching between the primary internet protocol connection and the back-up internet protocol connection to a provider of the primary internet protocol connection;
 obtaining a maintenance schedule from the provider of the primary internet protocol connection; and
 activating the back-up internet protocol connection to the subscriber premises in advance of the primary internet protocol connection being taken down for maintenance in accordance with the maintenance schedule.

9. The non-transitory computer readable medium of claim 8, wherein the monitoring is performed via a heartbeat signal.

10. The non-transitory computer readable medium of claim 8, wherein the detecting the degradation comprises:
 periodically sampling performance data of the primary internet protocol connection; and
 detecting the degradation if the performance data falls below a predefined threshold.

11. The non-transitory computer readable medium of claim 8, wherein the primary internet protocol connection comprises a wireline internet protocol data connection and the back-up internet protocol connection comprises a wireless internet protocol data connection.

12. The non-transitory computer readable medium of claim 8, further comprising:
 monitoring the primary internet protocol connection after the activating the back-up internet protocol connection to determine if the primary internet protocol connection is functioning properly;
 activating the primary internet protocol connection when the primary internet protocol connection is functioning properly; and
 deactivating the back-up internet protocol connection.

13. The non-transitory computer readable medium of claim 8, wherein the activating is performed automatically.

14. The non-transitory computer readable medium of claim 8, further comprising:
 before the activating, providing a subscriber with a notification that the degradation is detected; and
 providing the subscriber an option to activate the back-up internet protocol connection on a pay-per-use basis.

15. An apparatus for providing a back-up internet protocol connection, comprising:
 a processor; and
 a non-transitory computer-readable medium storing a plurality of instructions, which, when executed by the processor, cause the processor to perform operations, the operations comprising:
  monitoring a primary internet protocol connection to a subscriber premises, wherein the primary internet protocol connection services a plurality of endpoints at the subscriber premises;
  detecting a degradation of the primary internet protocol connection to the subscriber premises;
  providing an option to snooze a notification that the primary internet protocol connection has degraded and to switch over to the back-up internet protocol connection at a later time;
  activating the back-up internet protocol connection to the subscriber premises to provide a service to the plurality of endpoints at the subscriber premises at the later time; and
  reporting a frequency of switching between the primary internet protocol connection and the back-up internet protocol connection to a provider of the primary internet protocol connection;
  obtaining a maintenance schedule from the provider of the primary internet protocol connection; and
  activating the back-up internet protocol connection to the subscriber premises in advance of the primary internet protocol connection being taken down for maintenance in accordance with the maintenance schedule.

16. The apparatus of claim 15, wherein the detecting the degradation comprises:
 periodically sampling performance data of the primary internet protocol connection; and
 detecting the degradation if the performance data falls below a predefined threshold.

17. The apparatus of claim 15, wherein the primary internet protocol connection comprises a wireline internet protocol data connection and the back-up internet protocol connection comprises a wireless internet protocol data connection.

18. The apparatus of claim 15, further comprising:
 monitoring the primary internet protocol connection after activating the back-up internet protocol connection to determine if the primary internet protocol connection is functioning properly;
 activating the primary internet protocol connection when the primary internet protocol connection is functioning properly; and
 deactivating the back-up internet protocol connection.

19. The apparatus of claim 15, wherein the activating is performed automatically.

20. The apparatus of claim 15, further comprising:
 before the activating, providing a subscriber with a notification that the degradation is detected; and
 providing the subscriber an option to activate the back-up internet protocol connection on a pay-per-use basis.

* * * * *